United States Patent
Ghislain Bossut et al.

(10) Patent No.: US 6,195,101 B1
(45) Date of Patent: Feb. 27, 2001

(54) METHOD AND SYSTEM FOR IMAGE TEMPLATES

(75) Inventors: Philippe Joseph Ghislain Bossut, Berkeley; Natasha Deganello, San Francisco, both of CA (US); Adolfo Vide, Donneville (FR)

(73) Assignee: MGI Software Corporation, Richmond Hill (CA)

( * ) Notice: Subject to any disclaimer, the term of this patent is extended or adjusted under 35 U.S.C. 154(b) by 0 days.

(21) Appl. No.: 09/056,577

(22) Filed: Apr. 6, 1998

(51) Int. Cl.[7] .................................................. G06T 11/00
(52) U.S. Cl. ........................ 345/433; 345/434; 345/435
(58) Field of Search ................................... 345/433, 435, 345/420, 434, 421, 429, 428; 382/28 H, 276

(56) References Cited

U.S. PATENT DOCUMENTS 5,121,448 * 6/1992 Katayama et al. .................. 382/284
5,880,740 * 3/1999 Halliday et al. ..................... 345/435
5,907,640 * 5/1999 Delean ................................. 382/276
5,995,107 * 11/1999 Berteig et al. ....................... 345/420

FOREIGN PATENT DOCUMENTS 9422101    9/1994 (WO) .

* cited by examiner

Primary Examiner—Mark Zimmerman
Assistant Examiner—Kimbinh T. Nguyen
(74) Attorney, Agent, or Firm—Blakely, Sokoloff, Taylor & Zafman

(57) ABSTRACT

A method and system for enabling a user to import a user-defined graphics edit into at least one template, the method including the steps of selecting, by the user, at least one first editable object, editing, by the user, at least part of the at least one first editable object, thereby producing a user-defined graphics edit, saving the user-defined graphics edit, selecting, by the user, a template containing at least one second editable object; and applying at least part of the user-defined graphics edit to at least part of the at least one second editable object within the template.

24 Claims, 5 Drawing Sheets

METHOD AND SYSTEM FOR IMAGE TEMPLATES

FIELD OF THE INVENTION

The present invention relates to electronic editing and more particularly to the use of templates in graphics editing.

BACKGROUND OF THE INVENTION

Computerized editing of images is described in the following publication:

Delean, Bruno, *Method and System for Image Processing,* PCT International Publication WO 94/22101, published Sep. 29, 1994.

The use of templates in graphics applications is well known although not specifically dealt with in the foregoing publication.

Templates were first created in graphics applications with the intention of giving guidance to a user who has not mastered the most arcane tools and features of a graphics software package, or who does not want to spend too much time creating graphics applications from scratch. In image editing applications, software designers have discovered that templates, if embedded in a format that allows for editing of rich effects, can be used to compensate for a user's inability to create compelling graphic designs. Instead of requiring that a user create everything from a clean slate, templates enable a user to choose from a collection of carefully designed examples one that pleases the user or suits the user's needs. The graphics application has features that enable the user to further customize the template.

The use of templates is common in most desktop publishing applications, such as ADOBE® PAGEMAKER®, QUARK XPRESS® and MICROSOFT OFFICE®. MICROSOFT WORD®, MICROSOFT EXCEL® and MICROSOFT POWERPOINT® all come with extensive collections of templates. Templates are less commonly used in raster image editing applications since, most of the time, these applications do not store edits, but rather, they store the resulting pixel based image.

In the professional market, LIVE PICTURE®, MACROMEDIA X-RES® and METACREATION EXPRESSION® are among the few applications to provide templates. Some of the consumer level image editing application store edits in a layered structure, or expression tree, and are able to offer templates, often called "projects," to a user. This is the case for ADOBE® PHOTODELUXE®, LIVEPIX® and MICROSOFT PICTURE IT!®.

None of these applications, however, provides a way to process alternative designs at any point in the workflow. Specifically, in the prior art, templates are used in the following workflow:

Step 1: Choose a template.

Step 2: Select elements in the template to be edited.

Step 3: Edit the selected elements.

Step 4: Save or print.

If, at some point in the process, a user wants to change the template, the user has to start back from Step 1, losing whatever edits were performed in Steps 2 and 3.

SUMMARY OF THE INVENTION

The present invention describes a method and system which enables a user to change a template and apply to a new template the same edits performed previously to a previously used template. This has several important advantages. First, it allows the user to choose alternative styles at any point in the workflow. For example, the user can choose another birthday card style, while maintaining the same image or a different image, including image position, cropping and level of magnification, and while maintaining the same text containing the name of the birthday person. Second, it enables the application to create derivative products matching a common design and re-using user edits. For example, a set of matching business cards, letterheads, envelopes and flyers may all be created from edits performed on only one of them.

There exist in various public locations, kiosks which include image editing workstations. Examples include Kodak's COPYPRINT® Station and Polaroid's MAKE-A-PRINT®. In the context of such kiosks, the present invention improves productivity by enabling a user to choose from a set of different products to be printed without having to repeat the time-consuming template editing process.

The present invention enables a single image editing context to be applied to a variety of editable images, or templates, in an image editing system. The present invention also improves productivity of image editing kiosk systems, by creating a set of matching outputs from a single editing context.

There is thus provided in accordance with a preferred embodiment of the present invention a method for enabling a user to import a user-defined graphics edit into at least one template, the method including the steps of selecting, by the user, at least one first editable object, editing, by the user, at least part of the at least one first editable object, thereby producing a user-defined graphics edit, saving the user-defined graphics edit, selecting, by the user, a template containing at least one second editable object, and applying at least part of the user-defined graphics edit to at least part of the at least one second editable object within the template.

Moreover in accordance with a preferred embodiment of the present invention the at least one first editable object and the at least one second editable object are identical.

Additionally in accordance with a preferred embodiment of the present invention the at least one first editable object and the at least one second editable object are different.

Further in accordance with a preferred embodiment of the present invention the at least one first editable object resides within a first template and the at least one second editable object resides within a second template.

There is also provided in accordance with a preferred embodiment of the present invention a method for a user to produce a plurality of graphics outputs by reusing edited graphics content in multiple templates, the method including the steps of selecting, by the user, a first template containing at least one first editable object, editing, by the user, at least part of the at least one first editable object within the first template, thereby producing a user-defined graphics edit, saving the user-defined graphics edit, selecting, by the user, a second template containing at least one second editable object, and applying at least part of the user-defined graphics edit to at least part of the at least one second editable object within the second template.

Moreover in accordance with a preferred embodiment of the present invention the at least one first editable object and said at least one second editable object are identical.

Additionally in accordance with a preferred embodiment of the present invention the at least one first editable object and the at least one second editable object are different.

Further in accordance with a preferred embodiment of the present invention the user-defined edit contains geometric parameters useful to automate the positioning of editable objects.

Still further in accordance with a preferred embodiment of the present invention the template contains editable objects and non-editable objects.

Moreover in accordance with a preferred embodiment of the present invention at least one of the at least one first editable object and the at least one second editable object contains locked features and unlocked features, and wherein the applying step does not alter the locked features.

Additionally in accordance with a preferred embodiment of the present invention the user-defined edit includes a plurality of elements acting upon at least part of the at least one first editable object.

Further in accordance with a preferred embodiment of the present invention at least one element of the user-defined edit acts on multiple editable objects.

Still further in accordance with a preferred embodiment of the present invention them method also includes the step of automatically generating graphics outputs of various sizes following the applying step.

Moreover in accordance with a preferred embodiment of the present invention the graphics outputs are generated on a kiosk system.

There is also provided in accordance with a preferred embodiment of the present invention an imaging design system for enabling a user to import a user-defined graphics edit into at least one template, including at least one first editable object, an editor for editing, by the user, at least part of the at least one first editable object, thereby producing a user-defined graphics edit, a storage device saving the user-defined graphics edit, a template containing at least one second editable object, and a design processor, applying at least part of the user-defined graphics edit to at least part of the at least one second editable object within the template.

Moreover in accordance with a preferred embodiment of the present invention the at least one first editable object and the at least one second editable object are identical.

Additionally in accordance with a preferred embodiment of the present invention the at least one first editable object and the at least one second editable object are different.

Further in accordance with a preferred embodiment of the present invention the at least one first editable object resides within a first template and the at least one second editable object resides within a second template.

There is also provided in accordance with a preferred embodiment of the present invention an imaging design system for a user to produce a plurality of graphics outputs by reusing edited graphics content in multiple templates, including a first template containing at least one first editable object, an editor for editing, by the user, at least part of the at least one first editable object within the first template, thereby producing a user-defined graphics edit, a storage device saving the user-defined graphics edit, a second template containing at least one second editable object, and a design processor, applying at least part of the user-defined graphics edit to at least part of the at least one second editable object within the second template.

Moreover in accordance with a preferred embodiment of the present invention the at least one first editable object and the at least one second editable object are identical.

Additionally in accordance with a preferred embodiment of the present invention the at least one first editable object and the at least one second editable object are different.

Further in accordance with a preferred embodiment of the present invention the user-defined edit contains geometric parameters useful to automate the positioning of editable objects.

Still further in accordance with a preferred embodiment of the present invention the template contains editable objects and non-editable objects.

Moreover in accordance with a preferred embodiment of the present invention at least one of the at least one first editable object and the at least one second editable object contains locked features and unlocked features, and wherein the design processor does not alter the locked features.

Additionally in accordance with a preferred embodiment of the present invention the user-defined edit is comprised of a plurality of elements acting upon at least part of the at least one first editable object.

Further in accordance with a preferred embodiment of the present invention at least one element of the user-defined edit acts on multiple editable objects.

Still further in accordance with a preferred embodiment of the present invention the system also includes an output unit for automatically generating graphics outputs of various sizes.

Moreover in accordance with a preferred embodiment of the present invention the graphics outputs are generated on a kiosk system.

There is also provided in accordance with a preferred embodiment of the present invention a method for positioning an image relative to a cutout without changing the aspect ratio of the image, including identifying a zone of interest in the image, and translating and scaling the image so that a significant portion of the zone of interest appears within the cutout.

Moreover in accordance with a preferred embodiment of the present invention the significant portion of the zone of interest is as much relative area of the zone of interest as possible, but constrained so that the cutout remain entirely within the extent of the image.

Additionally in accordance with a preferred embodiment of the present invention the cutout is part of a template.

Further in accordance with a preferred embodiment of the present invention the identifying step is carried out manually.

Still further in accordance with a preferred embodiment of the present invention the identifying step is carried out automatically.

Moreover in accordance with a preferred embodiment of the present invention the identifying step is based on information as to how said image was positioned within a previous cutout.

There is also provided in accordance with a preferred embodiment of the present invention a system for positioning an image relative to a cutout without changing the aspect ratio of the image, including a zone of interest in the image, and an image transformer, translating and scaling the image so that a significant portion of the zone of interest appears within the cutout.

Moreover in accordance with a preferred embodiment of the present invention the significant portion of the zone of interest is as much relative area of the zone of interest as possible, but constrained so that the cutout remain entirely within the extent of the image.

Additionally in accordance with a preferred embodiment of the present invention the cutout is part of a template.

Further in accordance with a preferred embodiment of the present invention the image was positioned relative to a previous cutout, and the zone of interest is the portion of the image that was contained within the previous cutout.

DETAILED DESCRIPTION OF PREFERRED EMBODIMENTS

Figure 1:
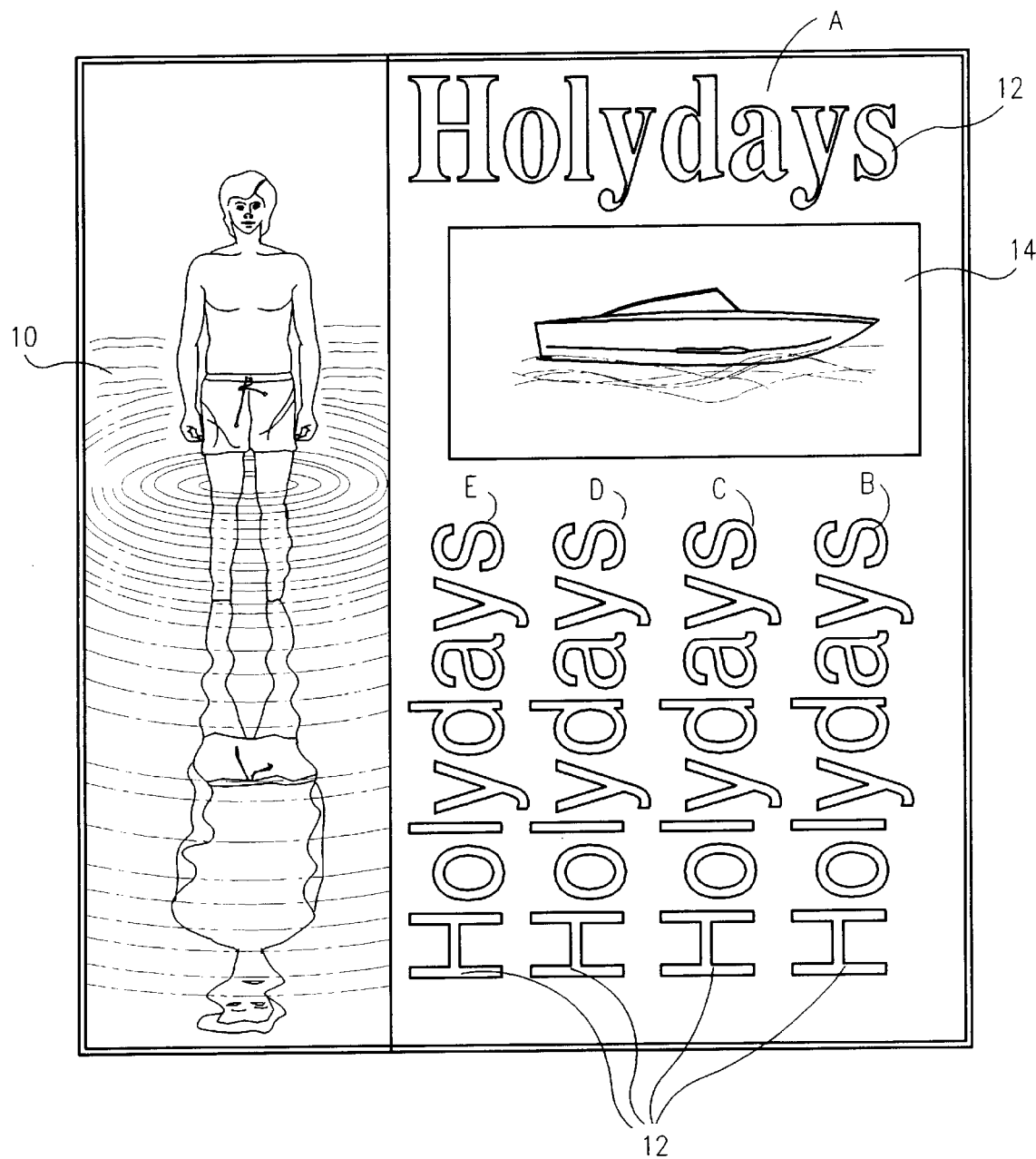
FIG. 1 is an illustration of a template with one editable image object and one text object.

The present invention provides a method and system for using a single user-defined edit in a plurality of editable graphics objects in corresponding templates. Throughout the present specification and claims, a user-defined edit refers to one or more editing steps that are initially defined by a user and may be used in multiple contexts. As will be seen below, the present invention applies to a variety of compositing techniques. However, for purposes of clarity and conciseness it will be presented in the context of a specific compositing technique known as FITS®, a registered trademark of Live Picture, Inc. of Campbell, Calif., U.S.A., this being a preferred embodiment. It is understood that the present invention is not limited to FITS® applications or techniques.

Brief Overview of FITS

In the aforementioned Delean PCT Publication WO 94/22101 entitled "Method and System for Image Processing," the contents of which are hereby incorporated by reference, a raster image processing system is described which composites a stack of image rendering layers. Generally, these image rendering layers (also referred to simply as "layers" hereinbelow) are of two types—image layers and paint layers. Image layers contain digital images which are to be incorporated into the composite image. Paint layers contain editing instructions which correspond to user modifications such as brush strokes, re-sizing, sharpening, contrasting, etc., which are described on pages 32–35 of the above-referenced Delean publication.

The Delean system is particularly advantageous in that it can be applied in a resolution-independent fashion, and thus can be used for image editing at multiple resolutions, displaying at any resolution and printing at any resolution. As such, the Delean system offers the user the capability of touching up coarse details at one resolution, and fine details at a magnified resolution.

As described on pages 14–17 of the above-referenced Delean publication, the Delean system operates by using an image format, referred to as IVUE®, a registered trademark of Live Picture, Inc. of Campbell, Calif., U.S.A., which stores multiple resolutions of a high quality image, in the form of an image pyramid, and stores the edits in mathematical functional form in a tree data structure. The edits thus occupy a small amount of storage, and their application does not destroy the original image. If the user so desires, some or all of the edits can be ignored, and the corresponding edit effect is eliminated. Moreover, this non-destructive editing is accomplished without use of intermediate image stores, and thus does not require the large amounts of memory typically required by conventional digital image compositing systems.

The Delean system uses an innovative technology referred to as "functional interpolating transfer system" (FITS), which relies upon a basic elementary operation for transition from layer i-1 to layer i:

$$F_i(x,y) = \alpha_i(x,y) F_{i-1}(x,y) + \beta_i(x,y) I_i(P_i(x,y)) + \gamma_i(x,y) \tag{1}$$

The index i refers to the successive layers. $F_i$ and $F_{i-1}$ denote the pixel values for layers i and i-1, respectively. $I_i$ denotes an imported image, and $P_i$ denotes a geometric transformation such as rotation, scaling and deformation. The coefficients $\alpha_i$ and $\beta_i$ denote opacity levels, and $\gamma_i$ denotes an external color term. Most editing and compositing operations are such that $\alpha_i = 1 - \beta_i$, and this will be assumed to hold in the ensuing discussion.

Equation (1) is recursive in nature, and can be iterated algebraically through all the layers i=1, 2, ..., m in the layer stack, to arrive at an explicit form $$F(x,y) = \alpha'_0 F_0(x,y) + \sum_{i=1}^{m} \alpha'_i(x,y) \beta_i(x,y) I_i(P_i(x,y)) + \gamma'(x,y) \tag{2}$$

where $F_0$ is the initial layer 0 image, which could be an all black background, and the primed quantities are given by $$\alpha'_i = \prod_{j=i+1}^{m} \alpha_j, \tag{3}$$

$$\gamma'_i = \sum_{i=1}^{m} \alpha'_i \gamma_i$$

Equation (2) is the fundamental FITS equation used in image rendering, for display or print. The coordinates (x,y) are real-valued, rather than integer valued, making them discretizable to any resolution. This is consistent with the resolution-independence inherent in the FITS model.

As explained on pages 29 and 30 of the aforesaid Delean publication, with reference to FIG. 10 therein, the FITS parameters $\alpha'_i$ and $\gamma'_i$ tend to be smoothly varying parameters of (x,y), as they represent editing effects such as brush strokes. Consequently, the FITS algorithm only evaluates these FITS parameters at selected grid points (x,y), typically one evaluation in every 4×4 block of pixel locations. This serves to speed up the RIP processing, since computation of these parameters can be elaborate. The values of the FITS parameters at the other grid points are obtained by bilinearly interpolating the values at the selected grid points. Thereafter, when all the FITS parameter values are determined, Equation (2) is used to compute pixel values at all pixel locations—hence, the name "functional interpolating transfer system" (FITS) for the technology. That is, the FITS RIP interpolates the functional parameters, rather than the pixel values themselves. The latter approach does not work well, as it destroys high frequency details of the image.

Equation (2) is of a local nature, in that F(x,y) only depends on the FITS parameters $\alpha'_i$ and $\gamma'_i$ at the location (x, y), and there is no coupling between different locations. Moreover, terms in the sum for which $\beta_i(x,y)=0$ need not be evaluated in arriving at F(x,y). In turn this means that in order to render a desired portion of the image, it is only necessary to apply Equation (2) at the points (x,y) that correspond to pixel locations in the desired portion. Thus, it may be appreciated that FITS does not require rendering of the entire image in order to view a portion thereof. As a result, the FITS RIP can be carried out very quickly, giving FITS a significant advantage over conventional techniques which require up to several minutes for the RIP operation.

Brief Overview of LivePixObject

FITS layers are powerful, but primitive objects. They do not carry a rich level of abstraction, and are difficult to use by a person who is typically not familiar with the concepts used commonly by professional graphics designers, such as "stencils," "alpha channels," "Bezier curves," etc.

In a consumer application such as LIVEPIX®, a registered trademark of Live Picture, Inc. of Campbell, Calif., U.S.A., a new level of interface to access graphical elements is defined on top of the FITS layers. This new level of abstraction is described in terms of objects in a LivePixObject class.

The LivePixObject class encapsulates several FITS elements. Specifically, a LivePixObject is a composite object containing the following elements:

- a general FITS layer (image or paint layer);
- a monochrome FITS paint layer representing the drop shadow as well as some shadow specific information, such as offset, color, feather and opacity;
- a FITS layer list containing color corrections for red eye removal;
- a global opacity;
- a feathering value; and
- a shape.

The shape can be defined by the following attributes:

- a vectorial Bezier path;
- a test string with the usual font, size and style attributes; and
- an alpha channel (i.e. a pointer to the opacity channel of an image).

The shape is converted into a stencil in the general FITS layer and the drop shadow.

The above elements can be easily accessed and modified through a programming interface for the LivePixObject class, as is typical for C++ and Java classes.

Since an objective of the present invention is to enable a user to switch between templates, and since a LivePixObject list is specific for a template, an ordered list of LivePixObjects is not an appropriate data structure to work with. The present invention adds another new level of abstraction with a mechanism to identify and access LivePixObjects independently from their order in a particular list. To accomplish this, the present invention introduces a new concept: the Template Context.

Definition of the Template Context

A template is a list of modifiable, or editable LivePixObjects and non-modifiable, or non-editable LivePixObjects. Only the modifiable objects are presented to the user via a template parser. The template parser lists all the modifiable objects and keeps the list in memory. The user can make edits to the objects in this list, and the edits are maintained in memory, available to be applied to other templates. A collection of these edits is a Template Context, also referred to as a user-defined edit.

Reference is now made to FIG. 1 which illustrates a rendered template containing only two editable objects; namely:

1. A subject image 10: This object is made, in this example, from two FITS image layers. The first is a simple image insertion later, the boy standing up. The second is an image distortion later, the reflection of the boy in the water.
2. A title text 12: This object is made, in this example, from five FITS mono-color paint layers, individually identified as A, B, C, D and E.

The top right image, indicated by reference numeral 14, although it is a FITS image layer, is not an editable object. A decision as to which objects are editable and which are not is made by the designer when creating the template. This choice is done in order to provide consistency to the design, and guidance to the user. In principle all objects can be made editable, but such a setup is likely to lead to templates that are not easy to customize.

In the specific template of FIG. 1, the user is able to:

Modify the subject image 10; i.e., substitute a new image in two different LivePixObjects. When the user moves the subject image, both the image of the boy and his reflected image in the water move accordingly, thus correctly illustrating the reflection; and Change the title text 12; i.e., change the text in the five different LivePixObjects (A–E).

From FIG. 1 it is apparent that, in order to provide rich but easy to use templates, one would like several LivePixObjects to be able to be modified at the same time by a single action of a user. The number and location of the LivePixObjects in the list may change from one template to another.

For these reasons, a Template Context should not be defined in terms of LivePixObjects. Rather, it should be defined in terms of specific Context Members.

Figure 2:
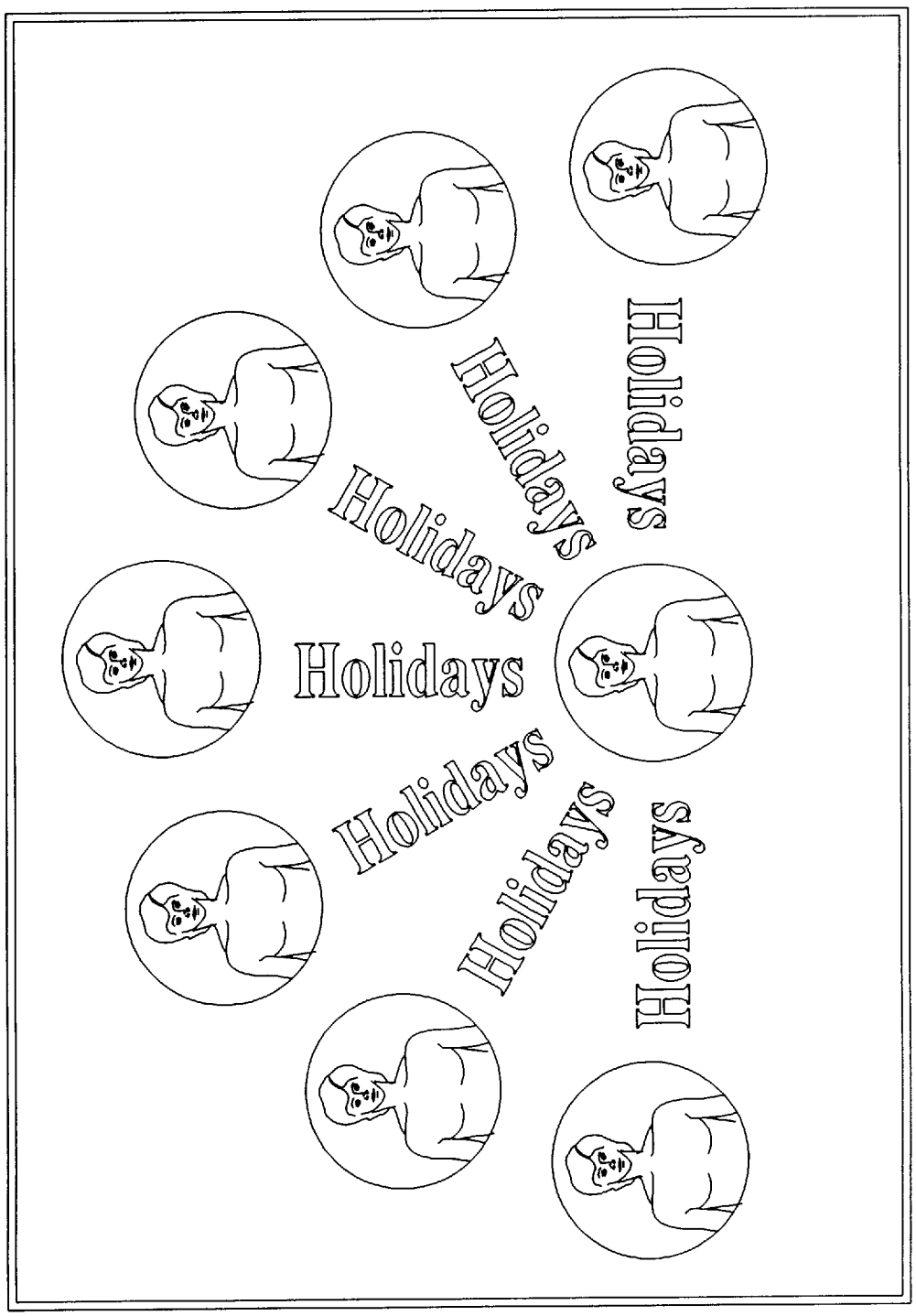
FIG. 2 is an illustration of application of part of a user defined edit of the template from FIG. 1 to a different template.

Reference is now made to FIG. 2, which illustrates two effects that may happen to the context of FIG. 1 when applied to another template:

1. A portion of the subject image 10 (FIG. 1) is inserted in several distinct locations. This is preferably done by preserving user-edited positioning information while taking the Glue Parameters, defined hereinbelow, into account. However, the color correction special effects that are part of the new template may be applied independently to each image, as seen in FIG. 2.
2. The title text 12 (FIG. 1) is re-positioned in new locations using the colors and fonts as specified in the template.

There are several types of Context Members. Each Context Member controls the modification of a relevant part of the composition. For example, the Context Member "TEXT-1" includes a method whose behavior is to replace a first string ("Holydays") in all the modifiable LivePixObjects referred to as "TEXT-1" with a second string ("Holidays"). As long as all edits made by a user in such a Template Context, also referred to as a user-defined edit, are maintained, any single context can be applied to multiple templates, even if the templates are radically different in terms of LivePixObjects, as illustrated in FIG. 1 and FIG. 2.

Description of the Template Context

A Template Context includes one or several Context Members. The implementations of Context Members derive from a single generic class.

Figure 3:
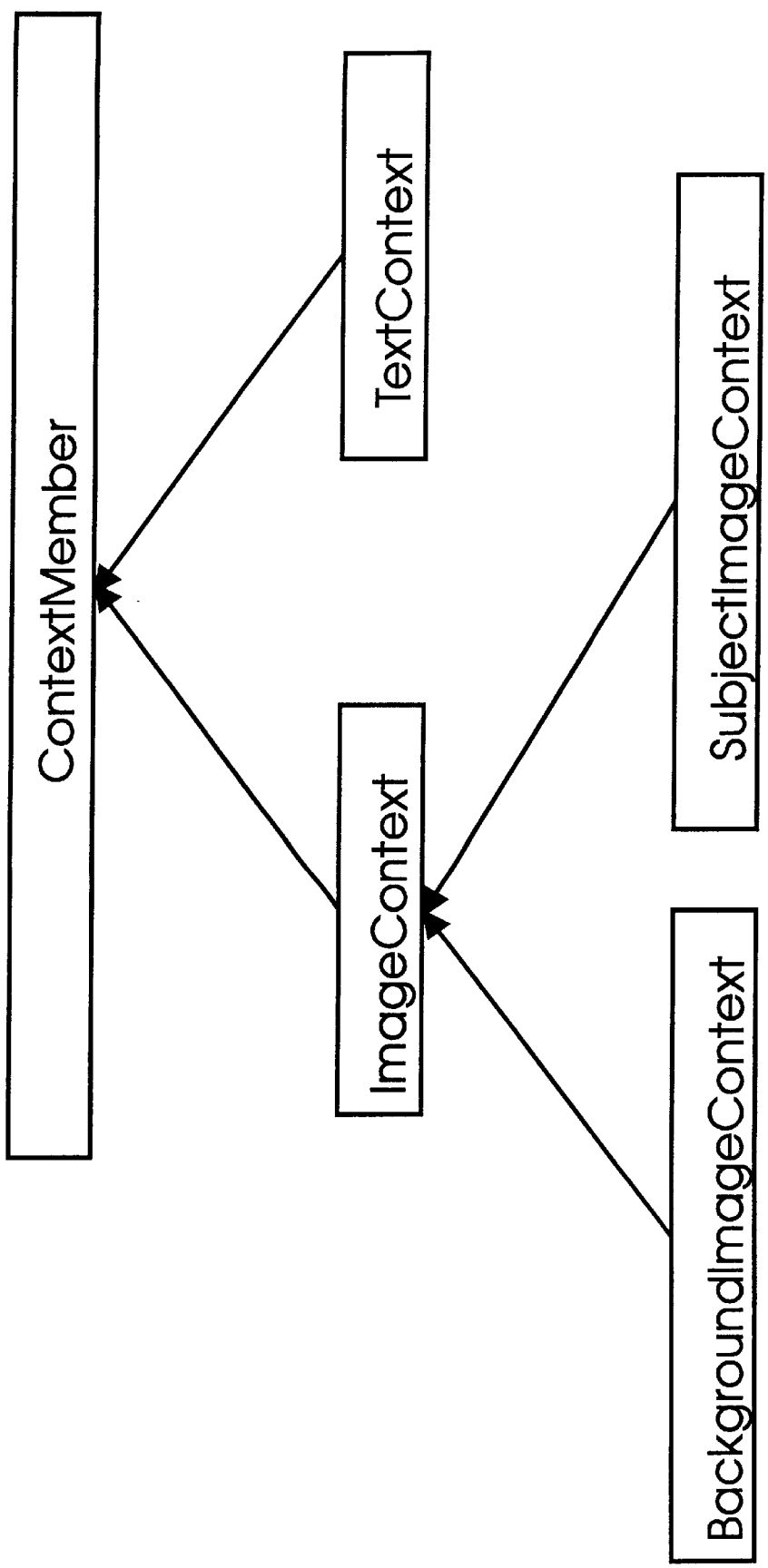
FIG. 3 is a simplified illustration depicting the hierarchy of objects constituting the Template Context used in a preferred embodiment of the present invention.

Reference is now made to FIG. 3, which illustrates the hierarchy of Context Members making up the Template Context structure, as used in a preferred embodiment of the present invention. It is straightforward for anyone skilled in the art to add new derivative classes from this hierarchy, to support new Context Members. FIG. 3 indicates three Context Members types in the hierarchy, as follows:

Text;

User Image; and

Background Image.

LivePixObjects are modified by Context Members. In order to identify LivePixObjects without knowing their location within a list, the present invention introduces a new set of object information for every LivePixObject in a template. This information describes which objects belong to specific Context Members. It contains:

- an identifier of the type of Context Member, one among the three used in a preferred embodiment;
- a symbol. There can be several Context Members of the same type; i.e., several editable text objects or several substitutable user images; and
- a list of attributes, to lock or unlock specific properties of the LivePixObject.

Automatic Positioning: Glue Properties

Substituting text is relatively straightforward but can involve a problem that arises when substituting text of one size by text of a different size; for example, substituting "A WORD" by "A VERY LONG SENTENCE." To properly position the substitute text, the present invention introduces new properties in a LivePixObject and in Context Members called Glue Properties. Glue Properties are used to replace text and other objects efficiently and automatically.

Substitution of images involves a problem similar to that encountered in substitution of text, in that re-positioning may be required to correctly place an image into a cutout originally designed for another image. This problem is compounded when switching from one template to another. An objective of the present invention is to re-use the fruits of the effort made by a user to identify a zone of interest and thereby to automate the repositioning in another template insofar as possible. The present invention accomplishes this preferably by using Glue Properties.

Another situation arises when a template contains a multiple-subject image. In such a case the present invention takes one of the images as a reference, labels it the Primary Image, and labels the other images as Secondary Images. All positioning is relative to this Primary Image. The relative transformation matrix between a placeholder image and a user-substituted image is used to position all of the Secondary Images. Glue Properties are preferably used to make the re-positioning automatic.

In an image FITS layer, a transformation matrix, designated here by $[T_p]$, used to position a placeholder image, is stored. When substituting the placeholder image with a user-substituted image, this matrix is typically not appropriate, and undergoes modification to fit the scaling and translation of the placeholder shape. These modifications are designed by $[T_g]$, and are computed by means of the Glue Properties.

Finally, in addition to these transformations, the user may further modify the positioning using tools provided in the user interface, thereby creating a third transformation matrix, designated here by $[T_u]$. For example, a designer could repeat the image several times following a curved path, or a user could designate a region of interest and a rotation or perspective. The composite matrix applied to the user image is thus $[T_u][T_g][T_p]$.

When substituting a Secondary Image there will likely be another placeholder matrix $[T_p]$ and another glue matrix $[T_g]$, however the user edit matrix $[T_u]$ is maintained. The composite matrix applied to the Secondary Image is thus $[T_u][T_g][T_p]$. By preserving the user edit matrix $[T_u]$ the designer and user edits are maintained in the substituted Secondary Image.

Consideration is now given to the problems that arise when switching from one template to another while maintaining a user's reposition information as much as possible. Part of the problems can be solved if the designers of a specific collection of templates make the templates homogeneous.

The remainder of the problems is addressed by Glue Properties. In many cases, an image has a "zone of interest;" for example, the face of a person or a landmark in a landscape—features that constitute the real "subject" of the picture. This zone of interest can be roughly described by a rectangular zone in the image. Conversely, a designer can specify such a zone of interest in the placeholder image used in the template when designing the cutout of the image.

To automatically position a user's image, the zones of interest of the user image and placeholder image should be made to match as closely as possible. One approach, which is not very user-friendly, is to let the user specify the zone of interest. Another approach is to automatically detect the zone of interest when the user first places a picture on the template, by computing the part of the picture visible through the placeholder cutout. This gives a fair estimate of the user's zone of interest. When the user first places a picture on a template, the user can use user interface tools to re-center, re-scale and rotate the image to put a subject right in the middle of the placeholder cutout.

The zone of interest is stored in the relevant Context Member, along with the transformation matrix that includes rotation and perspective correction information. The zone of interest and the transformation matrix form the image Glue Parameters.

When switching to another template, the transformation matrix is applied to an image, and the image is made to fit in the new environment by re-centering and re-scaling the zones of interest. In a preferred embodiment, this is done by maximizing the area of the user's zone of interest seen through the cutout frame, constrained so that the image frame always surrounds the cutout frame.

Figure 4:
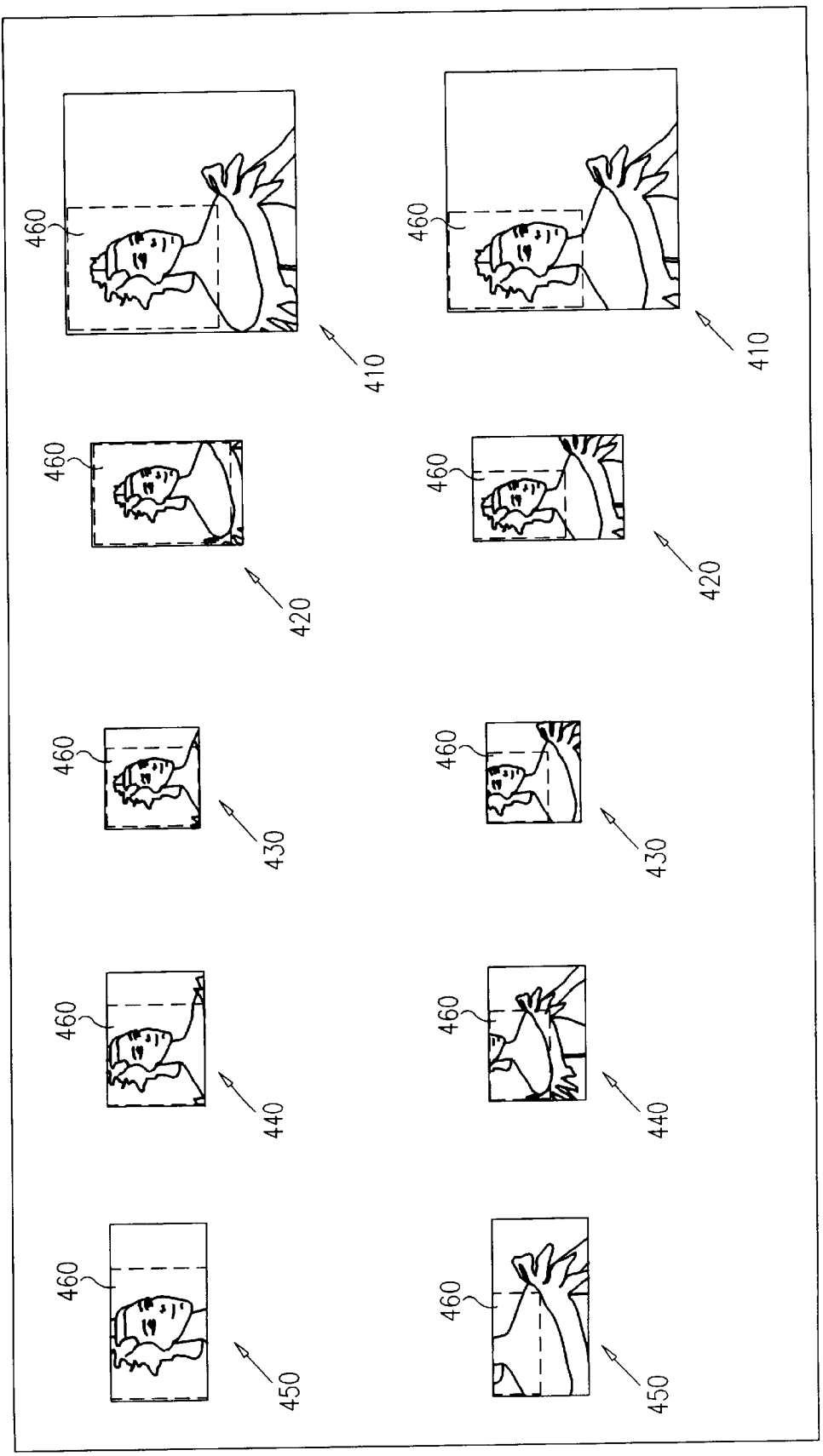
FIG. 4 is an illustration of a substitution method according to a preferred embodiment of the present invention, using Glue Parameters.

Reference is now made to FIG. 4 which illustrates the problem of substituting an image into different templates. An image 410 being used in a design appears at the right of each row. The image depicts a woman in a setting of flowers. Shown to the left of the image are four cutouts labeled 420, 430, 440 and 450, belonging to four different templates. The cutouts have different shapes and sizes, ranging from square to elongated. A designer wishing to use a template with one of these cutouts wants to position and scale the image within each of the templates without changing the aspect ratio of the image, so that the cutout is completely filled in (otherwise the design would have an empty "hole" in it), and so that the part of the image showing through the cutout is aesthetic. This involves careful positioning of the image within the template.

FIG. 4 illustrates two modes of substitution. The top row of rectangles illustrates substitution using Glue Parameters. The bottom row illustrates substitution not using Glue Parameters, but rather a center matching method, which is typically more efficient than simpler methods using one of the corners of the image.

Specifically, an image being substituted from one template to another appears on the right hand side of each row.

The image 410 shown at the right of the top row is identical to the image 410 shown at the right of the bottom row. Also shown is a zone of interest 460 containing a portion of the image representing a face. The zone of interest is a rectangular portion of the full image. Also shown are cutouts labeled 420, 430, 440 and 450 for substitute templates, each with its own shape for holding the image. The cutouts shown in the top row are identical to those shown in the bottom row.

In each instance of substitution in the top row, the positioning and scaling of the image within the cutout is determined in such a way that the image aspect ratio is preserved, and as much as possible of the zone of interest shows through the cutout. However, the zone of interest cannot be positioned or reduced in size beyond the point where the image frame would no longer encompass the cutout frame. Thus, for example, the left side of the zone of interest, being the left side of the image, must be positioned at the left side of the cutout.

In each instance of substitution in the bottom row, the positioning of the image within the cutout is determined in such a way that the center of the image is positioned at the center of the cutout, and the image frame encompasses the cutout frame. As a result, the face of the image can extend beyond the limits of the cutout, and thus not be seen, as in cutout 450 in the bottom row.

It is observed that in the top row, the position of the user image is almost perfectly centered, with the face showing through the cutout. In the bottom row, using only the center of the image as a reference point, the main subject is not centered. This discrepancy stems from the fact that the center of the image is not necessarily the center of a zone of interest in the image, since the subject is not necessarily centered in the image. As can be seen in FIG. 4, the use of Glue Parameters offers a dramatic advantage.

Other Properties

Other user defined edits can be maintained in a similar fashion, whereby part of the data is stored in the Context Member, and part in the LivePixObject. Such other edits may be simpler to deal with, since they can be composed without the need to maintain special references.

For example, when an image layer in a template has color correction parameters, this color correction is automatically composed with the user-defined image color correction residing in the Context Member when an image is substituted. User-defined color correction is typically used to compensate for brightness, contrast and color balance errors, whereas the template color correction is defined by the designer to add special effects such as over-saturation, conversion to black and white, sepia, and the like. In a preferred embodiment, color correction is defined by a set of three look-up tables in RGB color space, and one color transformation matrix.

To provide additional flexibility, a designer can set several Substitution Properties in the LivePixObject. These properties are:

boolean isPrimaryObect: if set, the LivePixObject is the Primary object in a group of objects pointing to the same Context Member (same Context identifier and number);

boolean fontLocked: if set, the font is not substituted by the Context Member font;

boolean styleLocked; if set, the style is not substituted by the Context member style;

boolean sizeLocked: if set, the size of the font is not substituted by the Context Member size of the font; and boolean colorLocked: if set, the text color is not substituted by the Context Member text color.

Figure 5:
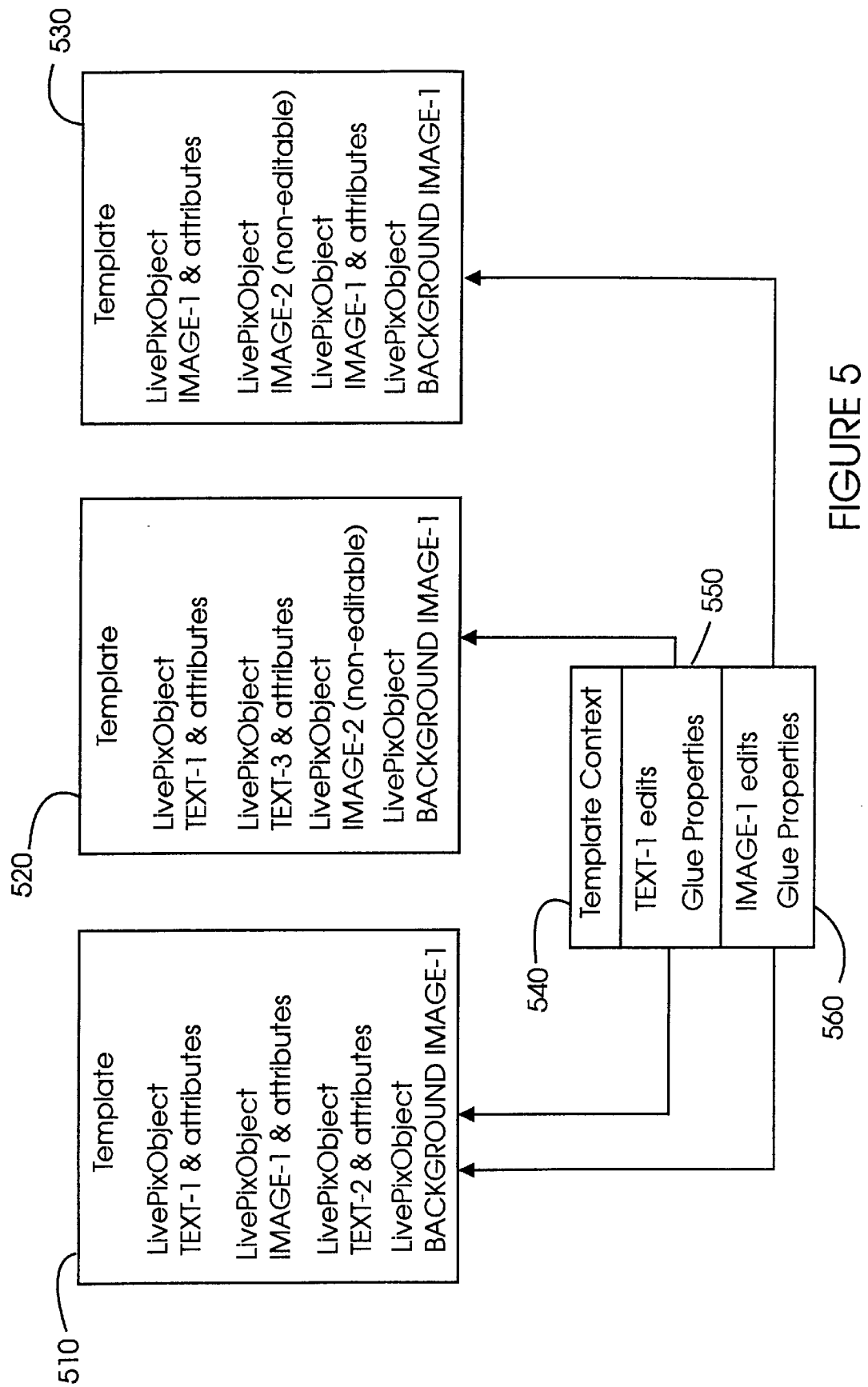
FIG. 5 is an example illustration of the inter-relationship between LivePixObjects, templates and Template Contexts in accordance with a preferred embodiment of the present invention.

Reference is now made to FIG. 5 which illustrates the interrelationship between LivePixObjects, templates and Template Contexts in a typical example. Shown in FIG. 5 are three different templates, labeled 510, 520 and 530. Template 510 typically contains two text objects, one image object and one background image object. All four of these objects are editable.

Template 520 typically contains two text objects, one image object and one background image object. The image object is non-editable. Moreover the background image and one of the text objects in Template 520 share the same identification (context type and number) with the background image and one of the text objects in Template 510. Template 530 typically contains three image objects and one background image object. The second image object is non-editable. The first image object shares the same identification with the image object in Template 510, and the background object shares the same identification with the background objects from Template 510 and Template 520.

Also illustrated in FIG. 5 is a Template Context or user-defined edit 540 containing edits and associated Glue Properties for TEXT-1 LivePixObjects, along with edits and associated Glue Properties for IMAGE-1 LivePixObjects. The TEXT-1 edits apply to the TEXT-1 LivePixObjects in Template 510 and Template 520. The IMAGE-1 edits apply to the IMAGE-1 LivePixObjects in Template 510 and Template 530. When applied to Template 530, the IMAGE-1 edits represent multiple substitution, since there are two IMAGE-1 LivePixObjects in Template 530. In applying these edits to the TEXT-1 and IMAGE-1 LivePixObjects, only the unlocked attributes of the LivePixObjects are affected. Template Context 540 may have been created when user edits were applied to Template 510.

Although the above discussion references the FITS compositing system, it can be appreciated by those skilled in the art that the concepts of Template Context and Context Member apply to general image compositing systems.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for enabling a user to import a user-defined graphics edit into at least one template, the method comprising:

selecting, by said user, at least one editable object;

editing, by said user, at least part of said at least one editable object by adjusting at least its position, size, orientation, shape, characteristics, text, lettering or color values, thereby producing a user defined graphics edit;

saving said user-defined graphics edit;

selecting, by said user, a template containing a foreground image with at least one cutout region for placing at least part of the at least one editable object therein; and automatically re-using at least part of said user-defined graphics edit to automatically place at least part of said at least one editable object within said at least one cutout region.

2. A method for a user to produce a plurality of graphics outputs by reusing edited graphics content in multiple templates, the method comprising:

selecting, by said user, a first template containing a foreground image with at least one first cutout region for placing at least part of at least one editable object therein;

editing, by said user, at least part of said at least one editable object by adjusting at least its position, size, orientation, shape, characteristics, text, lettering or color values, thereby producing a user defined graphics edit;

saving said user-defined graphics edit;

selecting, by said user, a second template containing a second foreground image with at least one second cutout region for placing at least part of the at least one editable object therein; and automatically re-using at least part of said user-defined graphics edit to automatically place at least part of said at least one editable object within said at least one second cutout region.

3. A method according to claim 1 and wherein at least one of said at least one editable object contains locked features and unlocked features, and wherein said automatically re-using does not alter said locked features.

4. A method according to claim 2 and wherein at least one of said at least one editable object contains locked features and unlocked features, and wherein said automatically re-using does not alter said locked features.

5. A method according to claim 1 and wherein said user-defined graphics edit is comprised of a plurality of elements acting upon at least part of said at least one editable object.

6. A method according to claim 2 and wherein said user-defined graphics edit is comprised of a plurality of elements acting upon at least part of said at least one editable object.

7. A method according to claim 1 and wherein at least part of one of said at least one editable object is automatically placed in multiple cutout regions in the second template.

8. A method according to claim 2 and wherein at least part of one of said at least one editable object is automatically placed in multiple cutout regions in the second template.

9. A method according to claim 1 and also including automatically generating graphics outputs of various sizes following said automatically re-using.

10. A method according to claim 2 and also including automatically generating graphics outputs of various sizes following said automatically re-using.

11. A method according to claim 9 and wherein said graphics outputs are generated on a kiosk system.

12. A method according to claim 10 and wherein said graphics outputs are generated on a kiosk system.

13. An imaging design system for enabling a user to import a user-defined graphics edit into at least one template, comprising:

at least one editable object;

an editor for editing, by said user, at least part of said at least one editable object by adjusting at least its position, size, orientation, shape, characteristics, text, lettering or color values, thereby producing a user defined graphics edit;

a storage device saving said user-defined graphics edit;

a template containing a foreground image with at least one cutout region for placing at least part of the at least one editable object therein; and a design processor, automatically re-using at least part of said user-defined graphics edit to automatically place at least part of said at least one editable object within said at least one cutout region.

14. An imaging design system for a user to produce a plurality of graphics outputs by reusing edited graphics content in multiple templates, comprising:

a first template containing a foreground image with at least one first cutout region for placing at least part of at least one editable object therein;

an editor for editing, by said user, at least part of said at least one editable object by adjusting at least its position, size, orientation, shape, characteristics, text, lettering, or color values, thereby producing a user defined graphics edit;

a storage device saving said user-defined graphics edit;

a second template containing a second foreground image with at least one second cutout region for placing at least part of the at least one editable object therein; and a design processor, automatically re-using at least part of said user-defined graphics edit to automatically place at least part of said at least one editable object within said at least one second cutout region.

15. A system according to claim 13 and wherein at least one of said at least one editable object contains locked features and unlocked features, and wherein said design processor does not alter said locked features.

16. A system according to claim 14 and wherein at least one of said at least one editable object contains locked features and unlocked features, and wherein said design processor does not alter said locked features.

17. A system according to claim 13 and wherein said user-defined graphics edit is comprised of a plurality of elements acting upon at least part of said at least one editable object.

18. A system according to claim 14 and wherein said user-defined graphics edit is comprised of a plurality of elements acting upon at least part of said at least one editable object.

19. A system according to claim 13 and wherein at least part of one of said at least one editable object is automatically placed in multiple cutout regions in the second template.

20. A system according to claim 14 and wherein at least part of one of said at least one editable object is automatically placed in multiple cutout regions in the second template.

21. A system according to claim 13 and also including an output unit for automatically generating graphics outputs of various sizes.

22. A system according to claim 14 and also including an output unit for automatically generating graphics outputs of various sizes.

23. A system according to claim 21 and wherein said graphics outputs are generated on a kiosk system.

24. A system according to claim 22 and wherein said graphics outputs are generated on a kiosk system.

* * * * *